Oct. 26, 1965     A. F. FONDA     3,214,201
PIPE FLANGE
Filed May 29, 1962     2 Sheets-Sheet 1
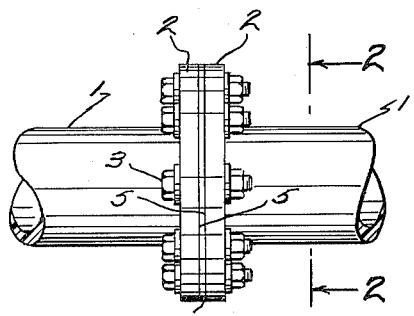
Fig. 1
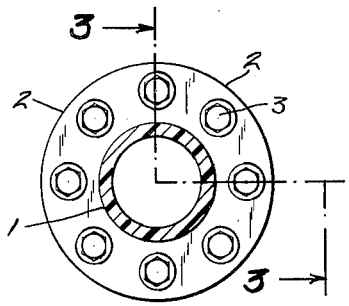
Fig. 2
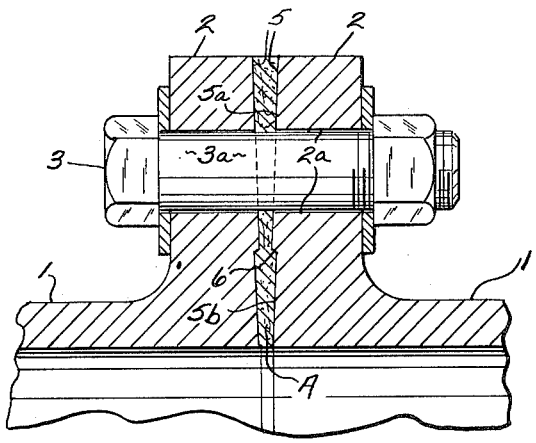
Fig. 3
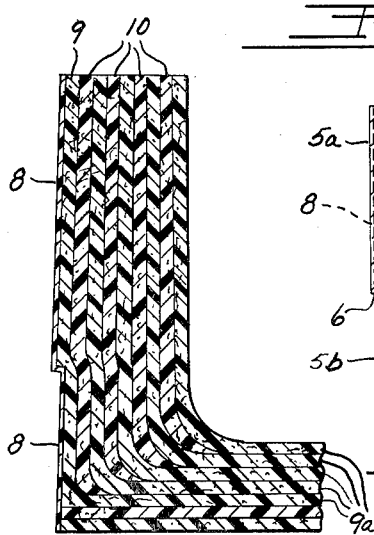
Fig. 11
Fig. 4
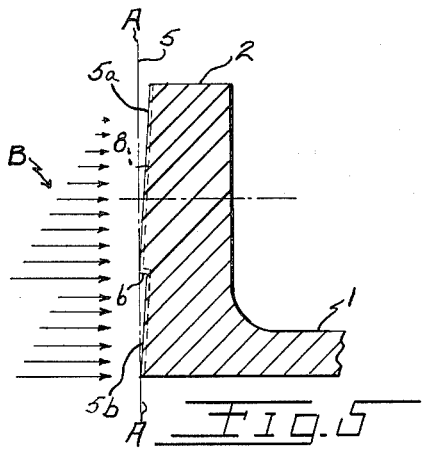
Fig. 5
INVENTOR.
ANTON F. FONDA
BY
Meyer, Baldwin, Doran & Egan
ATTORNEYS

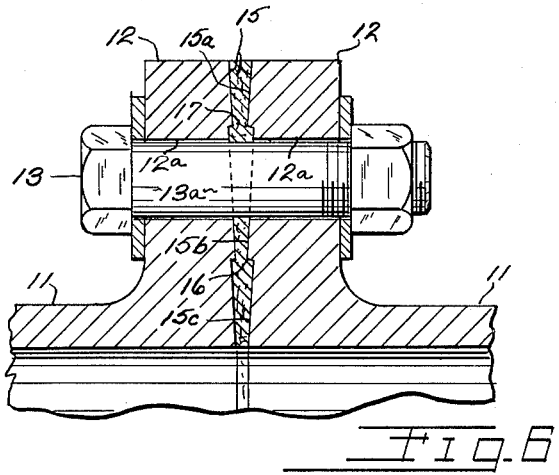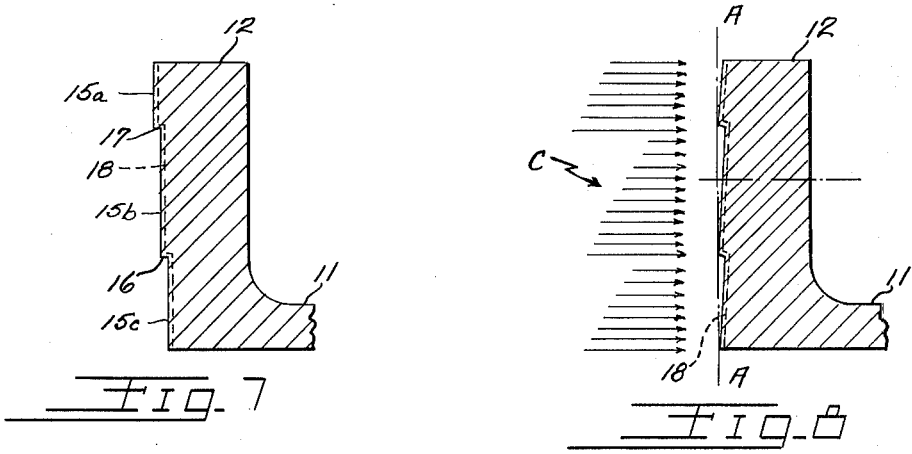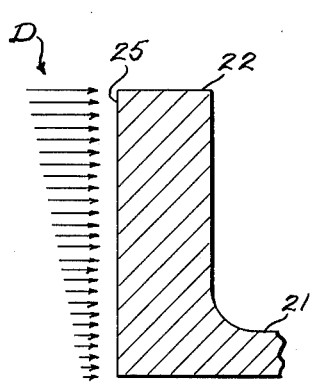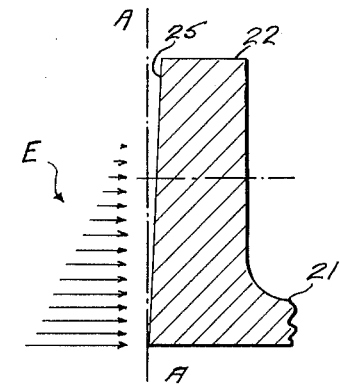

United States Patent Office 3,214,201
Patented Oct. 26, 1965

3,214,201
PIPE FLANGE
Anton F. Fonda, Cleveland, Ohio, assignor to The Ceilcote Company, Inc., Cleveland, Ohio, a corporation of Ohio
Filed May 29, 1962, Ser. No. 198,639
2 Claims. (Cl. 285—363)

This invention relates to nonmetallic flange construction and particularly to a reinforced plastic flange for a pipe or other pressure fluid carrying article.

Reinforced plastic flanges are commonly constructed by building successive layers of plastic permeated reinforcing material along the sides of a pipe or the like, said layers projecting radially outwardly a sufficient distance to provide a flange of the desired diameter. The reinforcing material is permeated with a suitable resin in a liquid state, and the resulting flange comprises successive, radiating layers of reinforced plastic wherein the layers are disposed generally at right angles to the axis of the flange and are of sufficient number to provide the desired flange thickness.

In the above type of construction, the inherent nature of the resins causes a shrinkage of the flange during polymerization along lines defined by the layers of reinforced plastic. This causes the face of the cured flange to camber away from the perpendicular with the outer periphery of said face being disposed below the level of the inner periphery thereof. When the faces of two such flanges are brought together, a wide gap is left between the flanges at their outer peripheries thereby making it difficult to effect an efficient seal between the flanges. This cambering effect can be controlled to a certain extent by elaborate pressure molds and by facing the flange after it is cured, but these methods are expensive and, in the latter case, destroy the resin rich face and weaken the flange.

The present invention has for its primary object the provision of a reinforced plastic flange that provides a resin rich face which is disposed generally at right angles to the axis of the flange and which is characterized by its ease of manufacture, inexpensive cost, the attractive forms in which it may be made, and the particularly effective manner in which it performs its function.

A more specific object of the invention is to provide a flange of the above type wherein there is provided a greater effective gasket sealing area in use than conventional flanges of the same general type.

Another object of the invention is to provide a flange having the above characteristics wherein none of the reinforcing fibers are cut or exposed at the face of the flange.

Still another object of the invention is to provide such a flange which is stepped at the face thereof in such manner that the highest or outermost edge of the step and the inner periphery of the face define a plane which is substantially perpendicular to the axis of the flange.

Yet another object of the invention is to provide a fluid tight connecting means for securing two pressure fluid carrying articles to each other comprising a pair of flanges having the above characteristics and a deformable gasket interposed therebetween.

Further objects of the present invention, and a number of its advantages will be referred to in or will be evident from the following description of two embodiments of the invention as illustrated in the accompanying drawings.

In the drawings,

FIG. 1 is a side elevation of a pair of connected, flanged pipes incorporating the first embodiment of the present invention;

FIG. 2 is a transverse section taken along the line 2—2 of FIG. 1;

FIG. 3 is an enlarged section taken along the line 3—3 of FIG. 2;

FIG. 4 is a sectional detail of a pipe flange as illustrated in FIG. 3 shown prior to polymerization thereof;

FIG. 5 is a view of the pipe flange of FIG. 4 shown after polymerization thereof;

FIG. 6 is a sectional view similar to FIG. 3 showing the second embodiment of the invention;

FIG. 7 is a sectional detail of a pipe flange as illustrated in FIG. 6 shown prior to polymerization thereof;

FIG. 8 is a view of the pipe flange of FIG. 7 shown after polymerization thereof;

FIG. 9 is a sectional detail of a pipe flange having an unstepped face, shown prior to polymerization thereof;

FIG. 10 is a view of the pipe flange of FIG. 9 shown after polymerization thereof; and FIG. 11 is an enlarged, sectional detail of the flange of the first embodiment showing the positions of the layers of reinforced plastic.

Before the article illustrated is specifically described, it is to be understood that the invention here involved is not limited to the structural details or arrangement of parts shown since flanges embodying the present invention may take various forms. It is also to be understood that the phraseology or terminology herein employed is for the purpose of description and not of limitation since the scope of the present invention is denoted by the appended claims.

FIG. 1 shows a pair of conduit means or pipes 1 having radially projecting, circumferentially continuous flanges 2 at their ends. The pipes 1 are secured together by bolt and nut assemblies 3 which project through suitable apertures circumferentially evenly spaced around the flanges 2. A deformable gasket 4 is interposed between the adjacent flanges 2 against which the faces 5 of said flanges are tightly drawn by the bolt and nut assemblies 3.

Referring now to FIG. 3, the face 5 of each flange 2 has a circumferentially continuous and uniform step 6 therein, the edge of which is disposed vertically above the inner peripheral edge of said face. Radially outwardly from the step 6, the face 5 is cambered or angled backwardly below or behind the level of the step to provide a slightly frusto-conical surface portion 5a wherein each circumferentially continuous surface filament or increment of circumferential area, moving outwardly, is axially inset from the next adjacent radially inwardly located filament or increment. Radially inwardly of the step 6 said face is similarly cambered backwardly to the bottom of the step to provide an inner, slightly frusto-conical surface portion 5b. The resultant flange face is thus provided with a mean radius or a mean frusto-conical surface area which is disposed at an acute angle relative to the longitudinal axis of the flange. The deformable gasket 4 is deformed on either side thereof to conform to the shape of the steps 6 of the adjacent flanges 2, said steps serving as fulcrum points and providing stress concentration areas which bite into the gasket due to the pressure exerted by the bolt and nut assemblies 3. A bolt 3a of each said bolt and nut assembly projects through suitable aligned apertures 2a of the flanges, said apertures being disposed radially outwardly beyond the circumferential step 6.

As herein illustrated and described, the pipes 1 and their associated flanges 2 are plastic, reinforced with fibrous glass or other suitable material. The reinforcing material shown is in the form of a mat made up of discrete fibers. The pipe 1 is made of concentric layers of the fibrous glass mat permented with the resin, and the flange 2 of each pipe comprises radially disposed layers of the mat also permeated with the resin. The detail of FIG. 11 illustrates this construction by showing the radiating flange layers of reinforced plastic at 9 and 10.

The layers 9 extend radially inwardly from the outer periphery of the flange and have inner extension portions 9a which project up the outside of the pipe 1 where they are bonded to said pipe by the cured resin. The layers 10 extend from the outer periphery of the flange inwardly only to the pipe 1 and are interposed between the layers 9. A sufficient number of layers 9 with their extensions 9a are used to firmly anchor the flange to the pipe, and the layers 10 are interposed for the purpose of building up the flange thickness. The number of layers 9 or 10 may be varied depending upon the desired flange thickness, strength, or the like. It will be understood that in the drawings, the thickness of the layers 9 and 10 is greatly exaggerated for the purpose of pictorial clarity.

As hereinbefore previously noted, during polymerization of a flange constructed as set forth above, the inherent tendency of the resin is to cause shrinkage of the plastic layers 9 and 10 in the direction of said layers. Insofar as this shrinkage affects the flange of the pipe, it becomes increasingly effective in a radial direction in such manner as to cause the face 5 of the flange to camber or angle rearwardly in the direction of the body of the pipe 1.

The effect of this shrinkage on a pipe flange having a smooth, unstepped face is illustrated in FIGS. 9 and 10. In the latter FIG. a reinforced plastic pipe 21 has a radiating flange 22 provided with a smooth face 25. FIG. 9 shows the shape of the flange 22 when said flange is first constructed and before polymerization of the plastic. At this time, said face 25 is perpendicular to the axis of the flange. FIG. 10 shows the same flange after the plastic has polymerized, and it will be noted that in the latter instance the face 25 has cambered away from a plane A—A which is perpendicular to the axis of the flange. This makes the surface of the face slightly frusto-conical in shape with the high or forward portion being at the inner periphery of the flange and the lowest or rearmost portion being at the outer periphery of said flange.

FIG. 4 illustrates a flange 2 of a pipe 1 in the form in which it is initially constructed and before the plastic has polymerized. At this stage of construction, the circumferentially continuous step 6 is formed in the face 5 and a resin layer 8 is provided on said face. If will be noted that both the surface portion 5a and the surface portion 5b are perpendicular to the center line of the flange with the surface 5a being disposed forwardly of or above the portion 5b to the extent of the depth of the step 6. FIG. 5 illustrates the effect of the shrinkage during polymerization which causes both of the surface portions 5a and 5b to angle rearwardly. The shrinkage also moves the edge of the step 6 rearwardly in such manner as to bring it into vertical alignment with the inner periphery of the face 5. Thus the inner periphery of the face and the edge of the step are now disposed in the perpendicular plane A—A with the surfaces 5b and 5a respectively cambering rearwardly therefrom.

When two of the flanges 2 are bolted together by the bolt and nut assemblies 3 with a gasket 4 interposed between the faces 5 thereof, two areas of concentrated pressure are effected upon said gasket with approximately equalized force. This is illustrated by the variable length arrows generally indicated at B in FIG. 5 wherein the greatest degree of force is represented by the longest arrows with the progressively shorter arrows representing progressively diminishing force. From this diagram it will be readily seen that a relatively large concentration of pressure is effective at the inner periphery of the face 5 which diminishes progressively in a radially outward direction to the step 6. At said step, there is another area of relatively great concentration of force which in turn progressively diminishes radially outwardly therefrom.

Referring now to FIGS. 6 and 8 of the drawings, the second embodiment of the invention comprises a pipe 11 having a radiating flange 12, said pipe and said flange being constructed in the manner set forth above in connection with the first embodiment of the invention. The illustration of FIG. 6 shows two pipes 11 with their flanges 12 secured together by bolt and nut assemblies 13 wherein the bolt 13a thereof is disposed through suitable aligned apertures 12a of the flanges. A deformable gasket 14 is interposed between faces 15 of the flanges 12 respectively.

Each face 15 is formed to provide two circumferential steps, an inner step 16 and an outer step 17, and a resin layer 18 is provided on said face (FIGS. 7 and 8). The inner step 16 is disposed radially inwardly from the bolt 13a, and the outer step 17 is disposed radially outwardly beyond said bolt. The edges of the steps 16 and 17 are disposed vertically above the inner periphery of the face 15 in such manner that the inner peripheral edge of the face and the edges of the steps 16 and 17 lie in a plane which is perpendicular to the axis of the associated flange. Application of torque to the bolt and nut assemblies 13 pulls the faces 15 inwardly toward each other whereby the steps 16 and 17 and the inner peripheral edges of the faces 15 bite into the deformable gasket 14 in circumferential areas of concentrated force.

Radially outwardly from the steps 17 each face 15 has a circumferentially continuous, backwardly or rearwardly cambered face portion 15a. Between the edge of the step 16 and the bottom of each step 17 said face has a second radially outwardly and backwardly cambered face portion 15b. From the inner peripheral edge of the face to the bottom of the step 16 there is provided a third cambered face portion 15c.

FIGS. 7 and 8 correspond to FIGS. 4 and 5 respectively in showing a flange 12 before and after polymerization of the resin. As shown in FIG. 7, the face 15 of the flange 12 is stepped forwardly at two places to provide the steps 16 and 17 with the face portions 15a, 15b and 15c being each perpendicular to the axis of the flange and horizontally stepped out of vertical alignment with each other. After the plastic has polymerized, the steps 16 and 17 have shrunk backwardly in such manner that the inner peripheral edge of the face 15 and the edge of each step 16 and 17 lie in the vertical or perpendicular plane A—A with the intervening face portions 15c, 15b and 15a being angled respectively rearwardly therefrom.

A pattern of variable length arrows generally indicated at C shows the three areas of concentrated pressure obtained by the flanges 12: at the inner periphery of the face 15, at the step 16, and at the step 17. The progressively shorter arrows illustrate the progressively decreasing pressure in a radially outward direction from each of the areas of concentration.

A pattern of variable length arrows at D in FIG. 9 shows the radial distribution of gasket pressure by a flange having a smooth perpendicular face. The greatest concentration of pressure is at the outer periphery of the flange adjacent to the bolts with such pressure progressively decreasing inwardly therefrom. The pattern of variable length arrows E in FIG. 10 similarly shows that with a smooth, cambered face on the flange, the greatest concentration of pressure is at the inner periphery of the flange and tightening of the bolt and nut assemblies puts the flanges under substantial stress and is likely to cause fracturing thereof.

Flanges of the invention as herein illustrated and described are particularly adapted for use with pipe or the like which is commonly subjected to high internal pressures. Under these high pressures, the pipe flanges tend to separate adjacent to the inner peripheries of the flange faces (5 or 15) and pivot at the center of the bolt holes (2a or 12a). Since the bolt holes are closer to the outer peripheries of the flanges, smooth perpendicular faces (such as that shown in FIG. 9) of completed flanges tend to afford a wide gap at their inner peripheries allowing fluid from the pipe to enter on either side of a gasket and tending toward eventual leakage. When tightening a pair of flanges of the type shown in FIG. 10, there is a deceptively wide gap left at the outer peripheries thereof between the flanges which leads to over torquing of the bolt assemblies and consequent fracturing of the flanges. If the face 25 is ground off to the perpendicular, then the resin rich surface of the face is destroyed and the reinforcing fibers are exposed to chemical attack.

The present invention makes it unnecessary that the resin rich surface of the flange face be destroyed. Also, it distributes the areas of concentration radially outwardly from the inner periphery of the flange face thereby substantially reducing the tendency of a pair of connected flanges to separate under high pressure conditions. As shown in FIG. 3 for example, an area of concentrated pressure is provided at the step 6 closely adjacent to the center of the bolt 3a about which the flanges tend to pivot under great internal pressures. Therefore, even though a slight separation may be effected adjacent to the inner peripheries of the flanges, very little separation will occur in the area of the steps 6 due to their proximity to the center of the bolts. The fact that the face portions 5a are cambered away from each other also reduces tensile stresses at the outer periphery of the flanges during this tilting or pivoting action.

The pinching of the gaskets in the area of the steps 6 also inhibits the gasket from blowing outwardly under high operating pressures. As internal pressures attempt to blow the gasket outwardly, said gasket will merely be forced more tightly against the steps and will, therefore, be less likely to blow out altogether.

The two step face 15 of FIGS. 6 and 8 provide two circumferential areas of concentrated pressure on the gasket radially outwardly from the inner peripheries of the flanges. It will be noted that the bolt holes 12a are disposed intermediate the steps 16 and 17 whereby tightening of the bolt and nut assemblies 13 tends to equalize the pressure between the two steps. It will also be noted in connection with the two step flange face that any tendency toward separation of the flanges adjacent to their inner peripheries would result in increased pressures upon the gasket by the steps 17 which are positioned radially outwardly from the pivot point of the flanges or the centers of the bolts 13a. The steps 16 thus serve as the primary sealing steps and the steps 17 serve as equalizing steps for assuring a tight seal at the step 16.

It has been found that with flanges manufactured according to the present invention, the torque required to effect an efficient seal between the opposing flange faces is less than one-half that which is required for comparable conventional flanges. In flanges having large radial dimensions two or more steps may be used although in most instances involving flanges of small to moderate size, one step in the flange face is found to be sufficient. It is preferred that the steps be located a substantial distance from the bolt holes to prevent chipping of the steps when the holes are drilled.

The amount of camber of the flange face due to shrinkage during polymerization depends upon the thickness of the flange, the radius of the flange, and the particular resin which is used. The step or steps formed during the initial lay up of the flanges (FIGS. 4 and 7) are of such height that, taking the foregoing variables into consideration, said steps will be in vertical alignment with the inner periphery of the associated face after the resin has completely polymerized.

This invention not only allows a plastic flange to polymerize in the normal manner, but it also takes positive advantage of the inherent shrinking and cambering effect and provide a flange having a resin rich face which needs no further operational treatment and which is substantially superior in its sealing efficiency to conventional flanges of the same general type.

It will be understood that the flange of this invention is herein illustrated and described in connection with pipe for the purpose of illustration of the invention and that it is not intended to be limited for use on pipes alone. It will also be understood that many changes in the details of the invention may be made without, however, departing from the spirit thereof or the scope of the appended claims.

What is claimed is:
1. A joint for securing two fluid carrier means in fluid-tight relation comprising a pair of fluid carrier means; circumferentially continuous radial flanges carried by said carrier means; said flanges having adjacent, opposed faces; each said face having a mean radius thereof disposed at an acute angle relative to the longitudinal axis of its associated flange, the apex of said angle being directed toward said axis; the radially inward edge of each said flange comprising a first fulcrum point; at least one additional circumferentially continuous fulcrum edge formed in each said flange and projecting axially away from each said face; said edges of each said flange disposed in a plane which is normal to the axis of the associated flange; each circumferentially continuous surface filament of each flange face area, located between said edges and between the radially outermost edge of the periphery of each said flange, being axially inset from the next adjacent radially inwardly located filament; means to draw said flanges together; and a gasket interposed between said flanges whereby each circumferential edge forms a stress concentration area when the flanges are drawn toward each other.

2. A joint for securing two fluid carrier means in fluid-tight relation comprising a pair of fluid carrier means; circumfenentially continuous radial flanges carried by said carrier means; said flanges having adjacent, opposed faces; one of said faces of one of said flanges having a mean radius thereof disposed at an acute angle relative to the longitudinal axis of said one flange, the apex of said angle being directed toward said axis; the radially inward edge of said one flange comprising a first fulcrum point; at least one addditional circumferentially continuous fulcrum edge formed in said one flange and projecting axially away from said face of said one flange; said edges disposed in a plane which is normal to the axis of said one flange; each circumferentially continuous surface filament of the flange face area of said one flange, located between said edges and between the radially outermost edge of the periphery of said one flange, being axially inset from the next adjacent radially inwardly located filament; means to draw said flanges together; and a gasket interposed between said flanges whereby each circumferential edge forms a stress concentration area when the flanges are drawn toward each other.

References Cited by the Examiner

UNITED STATES PATENTS

| 301,512 | 7/84 | Mixer. | |
| 1,791,810 | 2/31 | Furman | 285—328 X |
| 2,146,218 | 2/39 | Kimmich et al. | 285—368 X |
| 2,412,487 | 12/46 | Amley et al. | 285—328 |
| 2,533,868 | 12/50 | Anderson | 285—363 X |
| 2,606,574 | 8/52 | Lefebvre | 285—368 X |

FOREIGN PATENTS

| 95,759 | 5/49 | France. |
| 274,240 | 5/30 | Italy. |

CARL W. TOMLIN, *Primary Examiner.*

THOMAS F. CALLAGHAN, *Examiner.*